(12) United States Patent
Roy (10) Patent No.: US 12,114,188 B2
(45) Date of Patent: Oct. 8, 2024

(54) NETWORK CONNECTIVITY PERFORMANCE DETERMINATION ON COMPUTING DEVICES

(71) Applicant: Hewlett-Packard Development Company, L.P., Spring, TX (US)

(72) Inventor: Gaurav Roy, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 220 days.

(21) Appl. No.: 17/417,909

(22) PCT Filed: Aug. 9, 2019

(86) PCT No.: PCT/US2019/045954
§ 371 (c)(1),
(2) Date: Jun. 24, 2021

(87) PCT Pub. No.: WO2021/029856
PCT Pub. Date: Feb. 18, 2021

(65) Prior Publication Data
US 2022/0191719 A1    Jun. 16, 2022

(51) Int. Cl.
*H04W 24/08* (2009.01)
*H04L 43/028* (2022.01)

(52) U.S. Cl.
CPC ........... *H04W 24/08* (2013.01); *H04L 43/028* (2013.01)

(58) Field of Classification Search
CPC .................................................. H04W 24/08
See application file for complete search history.

(56) References Cited

U.S. PATENT DOCUMENTS

| | | | |
|---|---|---|---|
| 8,098,590 B2 | 1/2012 | Catovic et al. | |
| 9,565,578 B2 | 2/2017 | Chu et al. | |
| 9,639,412 B1 | 5/2017 | Levy et al. | |
| 2012/0284404 A1 | 11/2012 | Hofstaedter et al. | |
| 2013/0322265 A1 | 12/2013 | Kozisek et al. | |
| 2014/0376385 A1 | 12/2014 | Boss et al. | |
| 2015/0222507 A1 | 8/2015 | Choy et al. | |
| 2015/0295802 A1* | 10/2015 | Balakrishnan | H04L 43/0811 370/248 |

(Continued)

FOREIGN PATENT DOCUMENTS

| | | | |
|---|---|---|---|
| EP | 3322209 A1 | 5/2018 | |
| KR | 101337595 B1 | 12/2013 | |
| WO | 2015/057194 A1 | 4/2015 | |

*Primary Examiner* — Jason E Mattis
(74) *Attorney, Agent, or Firm* — Quarles & Brady LLP (57) ABSTRACT

Example implementations relate to determining router and computing device performance. An example non-transitory machine-readable medium can include instructions executable by a processor to capture, from an agent device on a computing device of a network, computing device data and network connectivity data associated with the computing device and filter data associated with connectivity to non-WiFi networks from the captured computing device data and network connectivity data. The instructions can be executable to filter out-of-network data from the captured computing device data and network connectivity data, correlate the filtered data with wireless router performance data, and determine router and computing device performances based on the correlation.

20 Claims, 4 Drawing Sheets

(56) References Cited

U.S. PATENT DOCUMENTS

| | | |
|---|---|---|
| 2017/0041813 A1 | 2/2017 | Reed et al. |
| 2017/0111813 A1 | 4/2017 | Townend et al. |
| 2017/0353991 A1 | 12/2017 | Tapia |
| 2017/0359735 A1 | 12/2017 | Jain et al. |
| 2018/0131751 A1 | 5/2018 | Jones |
| 2018/0139086 A1* | 5/2018 | Chakraborty ....... H04L 43/0823 |
| 2018/0314576 A1 | 11/2018 | Pasupuleti |
| 2018/0338187 A1 | 11/2018 | Ketonen et al. |
| 2019/0045370 A1* | 2/2019 | Al-Fanek .......... H04W 74/0816 |
| 2019/0116504 A1* | 4/2019 | Rusackas ................ H04L 41/22 |
| 2019/0261239 A1* | 8/2019 | Wang .................... H04W 36/08 |
| 2019/0326021 A1* | 10/2019 | Harrod, IV ........... H04W 88/02 |

* cited by examiner

NETWORK CONNECTIVITY PERFORMANCE DETERMINATION ON COMPUTING DEVICES

BACKGROUND

Device management includes configuring and deploying applications to computing devices within a network (e.g., an organization network) such as personal computers (PCs), laptops, and mobile devices. Device management can include providing centralized control of the computing devices.

DETAILED DESCRIPTION

As device management evolves, end users (e.g., administrators) may desire to collect specific data such as telemetry or configuration data about computing devices and the computing device environment. For instance, the data can include operating system (OS) data, application data, hardware configuration data, peripheral data, communication data, network connectivity data, or usability data, among others. The data, for instance, may be used to drive automation processes of a device management controller, test end user assumptions, feed analytical curiosity of end users, gain network connectivity insights or drive decision points for end users. As used herein, a computing device can be a mechanical or electrical device that transmits or modifies energy to perform or assist in the performance of human tasks. Examples include thin clients, personal computers, printing devices, laptops, tablets, smartphones, mobile devices, and gaming consoles, among others.

In some examples of the present disclosure, device management can include determining router (e.g., wireless router, wireless network router, etc.) and computing device performances using telemetry data collected by an agent device on an associated computing device. For instance, computing device information, location information, and network connectivity information can be collected and combined to determine network connectivity performance of routers and computing devices within a network. The network, for instance, can include an organization. For instance, the network can include routers and computing device within a single physical office location or across different physical locations, among others.

Using the performance data, recommendations can be made to improve performance of the routers and/or computing devices. For instance, recommendations for upgrades, augmentation of network in equipment (e.g., WiFi endpoints), and router or computing device replacements can be made. This can improve employee experience and performance based on improved and more consistent network connectivity.

Some approaches to determining router and computing device performance, particularly with respect to network connectivity, include a person walking around an office taking network connectivity measurements and recommending equipment changes. This can be inefficient, inconsistent, and may not allow for near-continuous monitoring. For instance, the frequency with which the router and computing device performances are monitored is based on how often the person walks around the office. Other approaches collect wireless router statistics from manufacturers regarding their service quality, but these approaches may be skewed, as they come from the manufacturer, and they do not consider computing device performance. In addition, such approaches are tracked on a per-router basis and are compiled manually, which can be inefficient, Yet other approaches include health monitors on computing devices. In such an approach, users or contractors monitor their own WiFi signal strength, which may result in inconsistencies in timeliness and accuracy of reporting. In addition, these other approaches do not allow for tracking of dynamic data associated with the network connectivity of the organization with respect to routers and computing devices.

Figure 1:
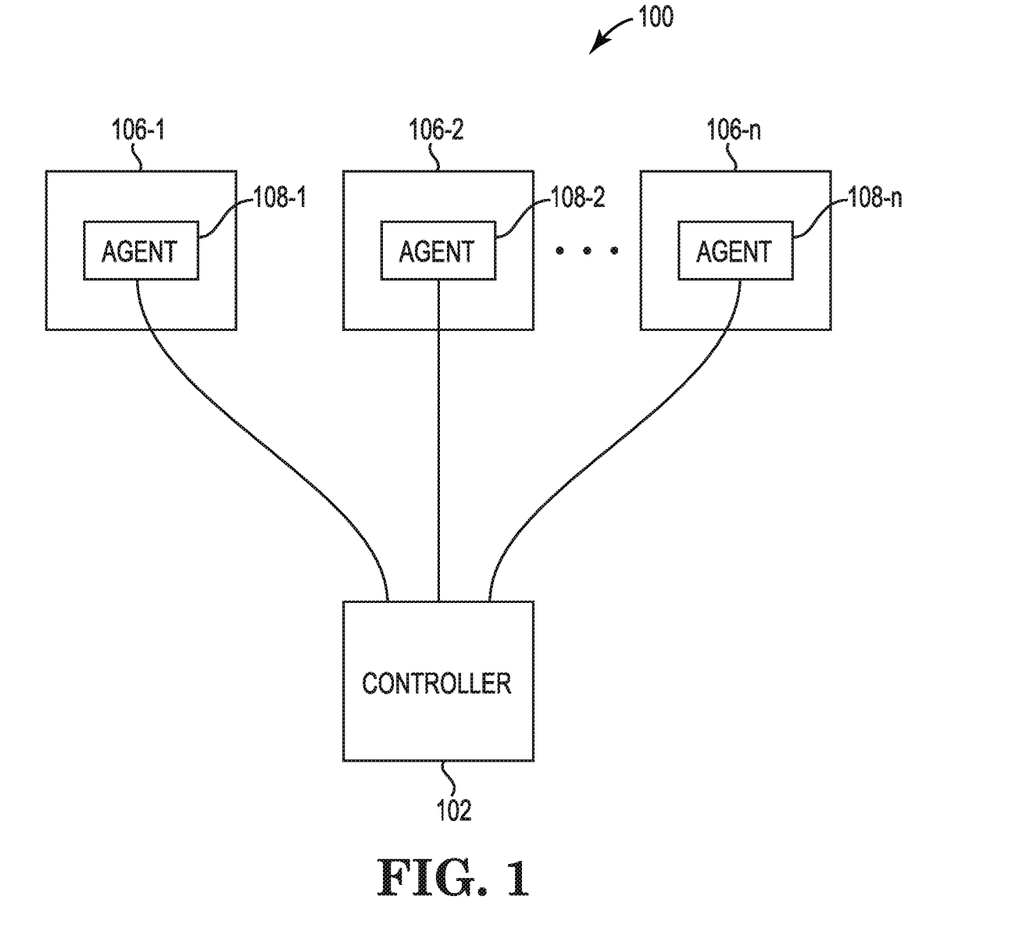
FIG. 1 illustrates a system for determining router and computing device performance including a controller and agent devices according to an example.

In contrast, examples of the present disclosure provide for collection of computing device information, computing device location information, network connection information, and network error and transmission data from a plurality of computing devices (or a single computing device) to gain insights about network connectivity within a particular network, such as an organization. For instance, some examples allow for periodic or near-continuous collection, by an agent device on a computing device, of telemetry data associated with network connectivity. Using this information, signal strengths and error rates of network wireless routers can be determined along with computing device performance (e.g., with respect to device network ports, cards, etc.), The agent device can be embedded in the computing device such that it is nonintrusive. The agent device may be pre-configured on the computing device, sent through a management framework, or installed manually, among others. Such data can be sent to a controller (e.g., a server) periodically (e.g., scheduled) or near-continuously (e.g., in real time), such that the computing device is constantly monitored by the agent device, and any data changes/updates are sent responsive to detection of the change/update, FIG. 1 illustrates a system 100 for determining router and computing device performance including a controller 102, computing devices 106-1, 106-2, . . . , 106-n (referred to herein after collectively as computing devices 106), and agent devices 108-1, 108-2, 108-n (referred to herein after collectively as agent devices 108) according to an example. The agent devices 108 can be housed (e.g., deployed, embedded, etc.) on a different one of a plurality of associated computing devices 106. The controller 102 can be communicatively coupled to computing devices 106, agent devices 108, and/or a graphical user interface (GUI) in some examples. As used herein, "communicatively coupled" can include coupled via various wired and/or wireless connections between devices such that data can be transferred in various directions between the devices. The coupling may not be a direct connection, and in some examples, can be an indirect connection. The controller 102 can be responsible for deploying tasks (e.g., requests for monitoring data associated with particular computing devices and wireless routers) to individual computing devices 106 for execution and gathering of responses to those tasks. For instance, the controller can deploy instructions to the agent devices 108 to perform the monitoring for the data, and the controller 102 can retrieve and compile notifications from the agent devices 108.

The agent devices 108 can monitor associated computing devices 106 for a plurality of data types including, for instance, computing device data, computing device connectivity data (e.g., wireless connectivity data), computing device, and WiFi error and transmission data. Additionally or alternatively, the agent devices 108 can monitor associated computing device 106 for wireless connectivity data and location data of a wireless router associated with a wireless router or routers within the network and associated with a computing device or computing devices 106.

Computing device data, as used herein, includes processor data, type of computing device data, memory data, network card data, etc. Computing device connectivity data, as used herein, includes performance, error, and statistical data with respect to the computing device's network connectivity (e.g., consistent strong signal, good connectivity to some wireless routers, poor to others, etc.). Computing device location data, as used herein, includes data regarding the physical location of the computing device. For instance, this may include data regarding to which wireless routers the computing device connects, connections and disconnections to an organizations network, etc. WiFi error and transmission data includes statistical and other data regarding error rates of the computing device and associated wireless routers associated with connecting to and maintaining connection to a WiFi network. Transmission data can include data regarding how much and what transmission rates occur with a computing device and associated wireless routers, in some examples. Wireless router wireless connectivity data and location data includes data regarding connectivity performance of wireless routers associated with the computing devices, as well as the locations of the wireless routers and to what WiFi networks they are connected.

The agent devices 108 can monitor the associated computing devices 106 for computing device network connectivity data and capture network connectivity statistics during a reboot of the associated computing devices 106 and when wireless connections to the associated computing devices 106 are created and lost. For instance, in some examples, each time a computing device 106 is rebooted, connects to a wireless router, and/or disconnects from the wireless router, the data is captured. By capturing at reboot and connection/disconnection, some examples of the present disclosure can reduce processor and memory consumption as compared to capturing data continuously. In some examples, the captured data may be frequently changing data (e.g., data may change multiple times per minute) and/or infrequently changing data (e.g., data changes at a slower rate).

In some instances, data can be monitored and/or captured periodically (e.g., scheduled) or near-continuously (e.g., in real time), and can periodically or near-continuously report the data to the controller 102. For example, an agent device 108-1 can notify controller 102 periodically of a change to one of the data types (e.g., reduction in signal strength of a wireless router associated with computing device 106-1). As used herein, near-continuously includes monitoring, capturing, reporting/notifying, etc. without meaningful breaks. For example, the agent device 108 may communicate with the controller 102 when data associated with a router changes, while in other examples, the agent device 108 communicates with the controller 102 in accordance with a predetermined schedule (e.g., hourly, daily, weekly, etc.). In some instances; frequently changing data is captured near-continuously, while infrequently changing data is captured periodically or as it changes.

In some examples, the monitoring and notification is performed iteratively. For instance, the monitoring and notification does not end when a data change is detected. Rather, the monitoring can be near-continuous such that the computing device is near-continuously monitored until instructions come to cease monitoring. For instance, the computing devices 106 can be near-continuously monitored for data changes with notifications sent to the controller 102 with each change detected. This process can be iterative such that the monitoring and notification continues until an outside source stops it (e.g., an administrator ceases the monitoring, a power outage, etc.).

The controller 102, in some examples, can include a processor, a memory resource, and/or engines. For instance, the controller 102 can be a combination of hardware and instructions for determining router and computing device performance. The hardware, for example can include the processor and/or the memory resource (e.g., machine-readable medium (MRM), computer-readable medium (CRM), data store, etc.).

The processor, as used herein, can include a number of processing resources capable of executing instructions stored by the memory resource. The instructions (e.g., machine-readable instructions (MRI)) can include instructions stored on the memory resource and executable by the processor to implement a desired function (e.g., determining router and computing device performance). The memory resource, as used herein, can include a number of memory components capable of storing non-transitory instructions that can be executed by the processor. The memory resource can be integrated in a single device or distributed across multiple devices. Further, the memory resource can be fully or partially integrated in the same device as the processor or it can be separate but accessible to that device and processor. Thus, it is noted that the controller can be implemented on an electronic device and/or a collection of electronic devices, among other possibilities.

The memory resource can be in communication with the processor via a communication link (e.g., path). The communication link can be local or remote to an electronic device associated with the processor. The memory resource includes engines, and the engines can include a combination of hardware and instructions to perform a number of functions described herein (e.g., determining router and computing device performance). The instructions (e.g., software, firmware, etc.) can be downloaded and stored in a memory resource (e.g., MRM) as well as a hard-wired program (e.g., logic), among other possibilities. In some examples, the engines may be composed on separate computing systems.

In some examples, the controller 102 can retrieve and compile notifications from the plurality of agent devices 108. For example, an agent device 108-1 may send data, including statistics, about a computing device 106-1. This data can include network connection data regarding connections of the computing device 106-1 to a particular wireless network, a particular wireless router or routers, whether it has a particular subscriber identity module (SIM) card installed on it (e.g., if the computing device 106-1 connects to a wireless network via the SIM card), what a wireless connection signal strength of the computing device 106-1 and/or associated wireless routers is, etc. Computing device location information including where the computing device 106-1 is physically located or to what wireless routers it is connected may also be retrieved and compiled by the agent device 108-1. Such data can be retrieved and compiled by the agent devices 108 for their associated computing device 106 sand sent to the controller 102 for retrieve when a computing device or computing devices 106 are connected or disconnected from a wireless network.

In some examples, the controller 102 can filter from the retrieved notifications out-of-network data and non-WiFi data. For instance, to protect personal information, personal network data may not be accessed by the controller 102. The controller 102 may have a list of wireless routers of which to compare retrieved data. If the retrieved data is associated with a router not on the list of wireless routers (e.g., associated with an in-home router, airport router, etc.), it can be filtered out and not stored. In some examples, the filtering can include comparing a network location to a computing device location, determining a connectivity timing of the computing device to a network wireless router, and excluding data that does not overlap between the network location and the connectivity to the network wireless router.

In some instances, the controller 102 can determine performance of a wireless router within a network of computing devices 106 housing the plurality of agent devices 108 using the filtered retrieved notifications. For instance, the controller 102 can determine the performance of the wireless router based on signal strength from the wireless router, wireless connectivity data associated with the wireless router, and data transfer data (e.g., how much data transferred via wireless connectivity) associated with the wireless router. In some examples, the aforementioned data, along with an amount of data transfer and an error rate happening over a period of time (e.g., related to a wireless router and/or a computing device 106) can be retrieved and compiled by the controller 102. This can be used to determine if a particular wireless router is underperforming, what computing device or computing devices 106 have weakest connectivity, etc. to determine the performances. For instance, patterns of routers and/or computing devices with the poorest performances can be tracked to determine patterns used in performance determinations, among other statistical analyses.

In some instances, the controller 102 can map the performance with performances of a plurality of other wireless routers within the network and performances of the computing devices 106. For instance, the mapping can include charts, graphs, etc. that illustrate the performances. In some examples, the mappings may be interactive, such that an administrator or other user may interact with the mapping via a graphical user interface (GUI), The GUI, in some instances, may be communicatively coupled to the controller 102. An administrator or other user may click on a mapping to receive a detailed report, which may be exported, for example, into a readable format. The report may include information on individual computing devices 106 and/or individual wireless routers, as well as overall network information and performance. Example reports may include bar charts, pie charts, or other charts that map signal strengths of wireless routers, device connectivity performances/statistics, and/or data transfer mechanisms, among others. The mappings may be pre-configured or tailored towards a particular organization, for instance. Determinations and/or recommendations can be made (e.g., by the controller 102 and/or by a person) regarding actions to be taken with respect to certain computing devices 106 or wireless routers. For instance, it may be determined to drop particular wireless routers or computing devices 106 and/or augment particular wireless routers, among other determinations.

Figure 2:
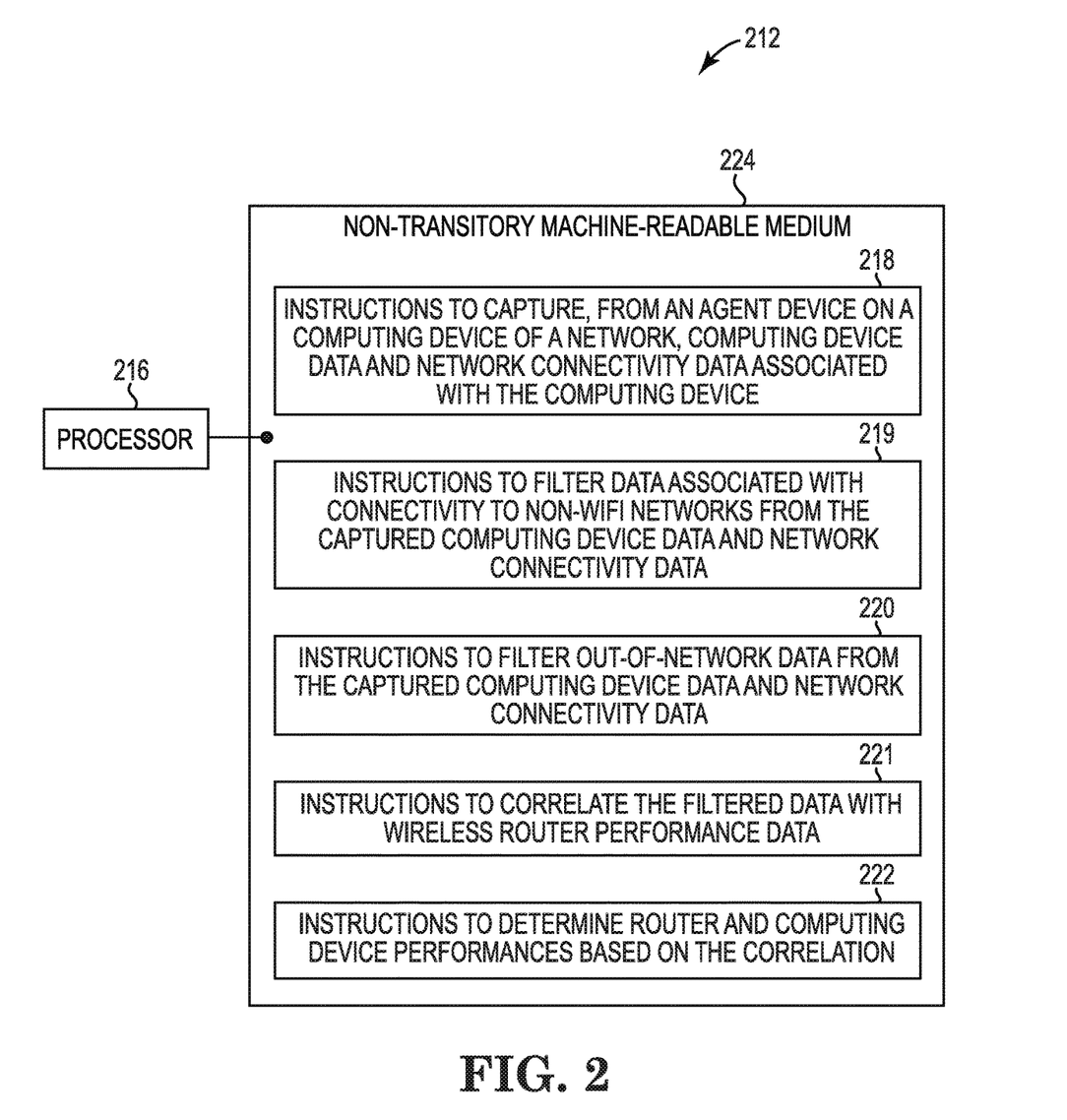
FIG. 2 illustrates another system for determining router and computing device performance including a processor and a non-transitory machine-readable medium (MRM)

FIG. 2 illustrates another system 212 for determining router and computing device performance including a processor 216 and a non-transitory machine-readable medium (MRM) 224. System 212 can be a server or a computing device (among others) in some examples and can include the processor 216. System 212 can further include the non-transitory MRM 224, on which may be stored instructions, such as instructions 218, 219, 220, 221, and 222. Although the following descriptions refer to a processor and a memory resource, the descriptions may also apply to a system with multiple processors and multiple memory resources. In such examples, the instructions may be distributed (e.g., stored) across multiple non-transitory MRMs and the instructions may be distributed (e.g., executed by) across multiple processors.

The non-transitory MRM 224 may be electronic, magnetic, optical, or other physical storage device that stores executable instructions. Thus, non-transitory MRM 224 may be, for example, Random Access Memory (RAM), an Electrically-Erasable Programmable ROM (EEPROM), a storage drive, an optical disc, and the like. The non-transitory MRM 224 may be disposed within a controller and/or computing device. In this example, the executable instructions 218, 219, 220, 221, and 222 can be "installed" on the device. Additionally and/or alternatively, the non-transitory MRM 224 can be a portable, external or remote storage medium, for example, that allows the system 212 to download the instructions 218, 219, 220, 221, and 222 from the portable/external/remote storage medium. In this situation, the executable instructions may be part of an "installation package". As described herein, the non-transitory MRM 224 can be encoded with executable instructions for determining router and computing device performance.

The instructions 218, when executed by a processor such as the processor 216, can include instructions to capture, from an agent device on a computing device of a network, computing device data and network connectivity data associated with the computing device. The computing device data can include data about the computing device itself such as a processor, SIM card data, memory, etc. The network connectivity data can include signal strength data, data transmission data, etc. associated with the computing device and/or associated wireless routers. The network connectivity data, in some examples, can be captured at a reboot of the computing device, a connection to a WiFi router, and/or a disconnection from the WiFi router. In some examples, computing device location data, network error data, and network transmission data are also captured from the agent device.

In some examples, the computing device data, network connectivity data, computing device location data, network error data, and/or network transmission data are captured as raw data. Raw data, for instance, includes data captured before analysis and/or filtering. For instance, raw data may include invalid data (e.g., a battery has 10,000 years of life left, incorrect networking byte data, etc.). Such invalid data may be a translation mistake (e.g., returning data in terms of years instead of seconds) or may be due to flaws in particular computing device models. In such examples, invalid data can be filtered from the raw data, and the filtered raw data can be stored to the cloud.

The instructions 219, when executed by a processor such as the processor 216, can include instructions to filter data associated with connectivity to non-WiFi networks from the captured computing device data and network connectivity data. For instance, data that is not associated with wireless connectivity and/or a SIM connection can be removed from the captured data. This can focus the determinations on wireless networks and the wireless connectivity performances of wireless routers and associated computing devices.

The instructions 220, when executed by a processor such as the processor 216, can include instructions to filter out-of-network data from the captured computing device data and network connectivity data. For instance, data that is associated with a public router (e.g., library, airport, etc.) or a personal router (e.g., in-home personal router) may be removed. For instances, such data may indicate the user is connected an out-of-office network, is physically located out of an office, and/or is using a computing device for personal matters. In an example in which personal privacy is not a concern, the out-of-network data may not be filtered.

The instructions 221, when executed by a processor such as the processor 216, can include instructions to correlate the filtered data with wireless router performance data. Correlating computing device data with wireless router data can allow for determinations based on signal strengths, connectivity consistency, error rates, etc. that indicate whether issues are with wireless routers, computing devices, or both.

For instance, the instructions 222, when executed by a processor such as the processor 216, can include instructions to determine router and computing device performances based on the correlation, and in some examples, the router and computing device performances can be mapped. For instance, the performances can include insights with respect to signal strength of wireless routers, connectivity performance of computing devices, and data transferred using insecure WiFi, among others. The mapped performances can include reports of low-performing computing devices and/or wireless routers in the form of human-readable summaries and detailed reports, among other presentation methods.

Figure 3:
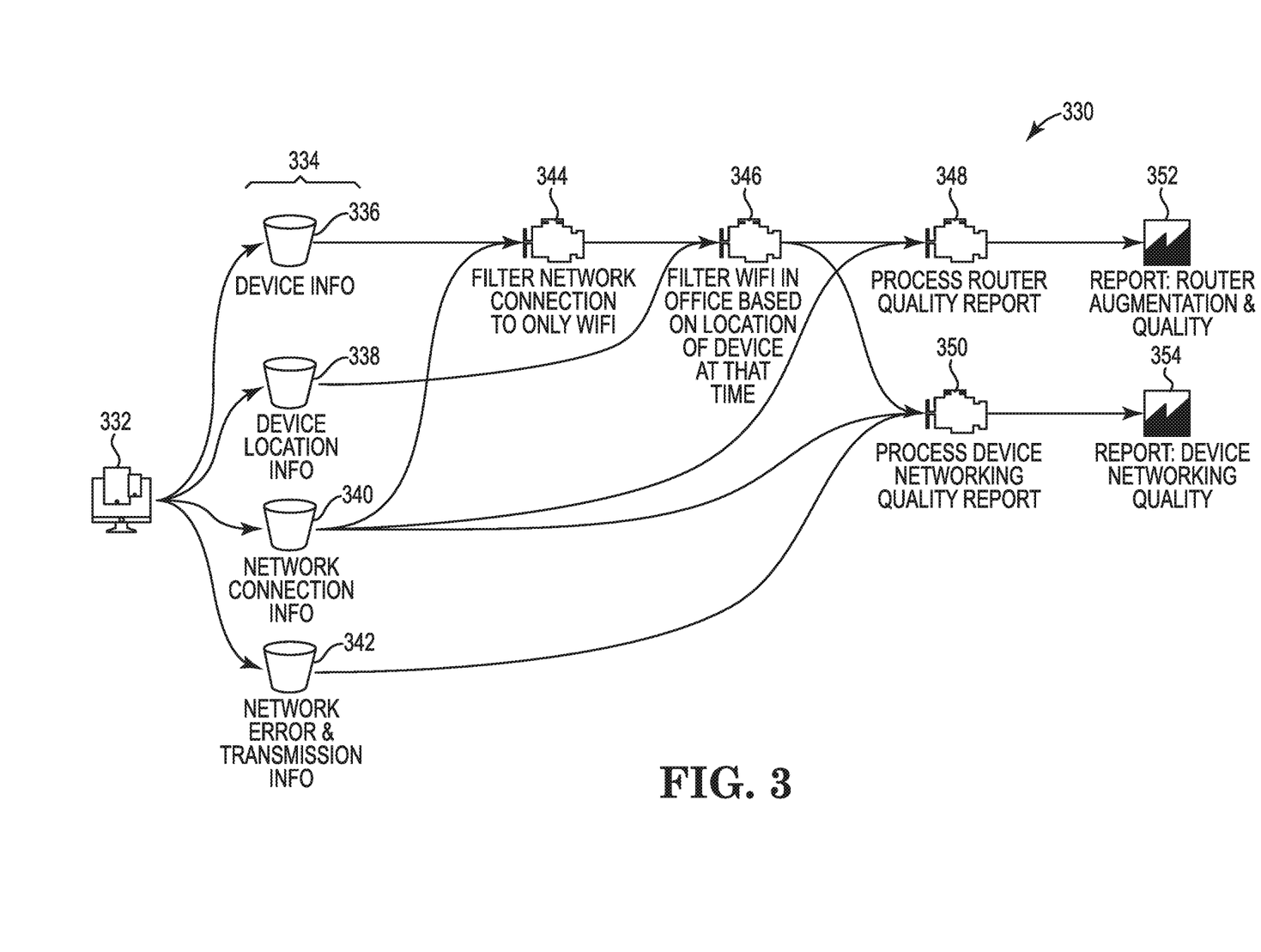
FIG. 3 illustrates a method for determining router and computing device performance according to an example.

FIG. 3 illustrates a method 330 for determining router and computing device performance according to an example. The method 330 may be performed by a system 212 and/or controller 102 as described with respect to FIGS. 1-2. At 332, agent devices located on computing devices collect data from each one of the computing devices and notify the controller at 334 that data has been detected and/or a change in data has been detected. For instance, device information data is sent to the controller at 336, device location data (or changes to it) is sent to the controller at 338, network connection data is sent to the controller at 340, and network error and transmission information is sent to the controller at 342. In some examples, the data can be transferred to a cloud (e.g., periodically, near-continuously, etc.).

At 344, non-WiFi connections are filtered from the data, and at 346, the data is filtered based on location data. For instance, to protect privacy of employees, an organization may filter out data collected when a computing device is located outside of a network (e.g., outside an office of the organization, etc.) or when the computing device is connected to a wireless router outside the network. For instance, data collected on personal networks is filtered out and not used. In some examples, computing device location data at the time of reboot, connection, or disconnection from a wireless network, and data related to connection/disconnection to an in-network location (e.g., office location, within an organization, etc.) is captured, while data related to connection/disconnection to an out-of-network location (e.g., in-home, airport, coffee shop, etc.) is removed.

At 348 and 350 respectively, router quality data and computing device networking data are processed. For instance, using the collected network connection data combined with the device and location data, router quality data including wireless routers consistently having lower quality (e.g., signal strength) can be identified. Using the error data and data transfer data, determinations can be made about computing device quality. For instance, if signal quality of a wireless router is good, but an associated computing device has poor connectivity, it may be determined that the computing device is the problem (e.g., networking card or port issues, among others.). Results of the processing can be mapped (e.g., human-readable reports created) at 352 and 354, respectively.

Figure 4:
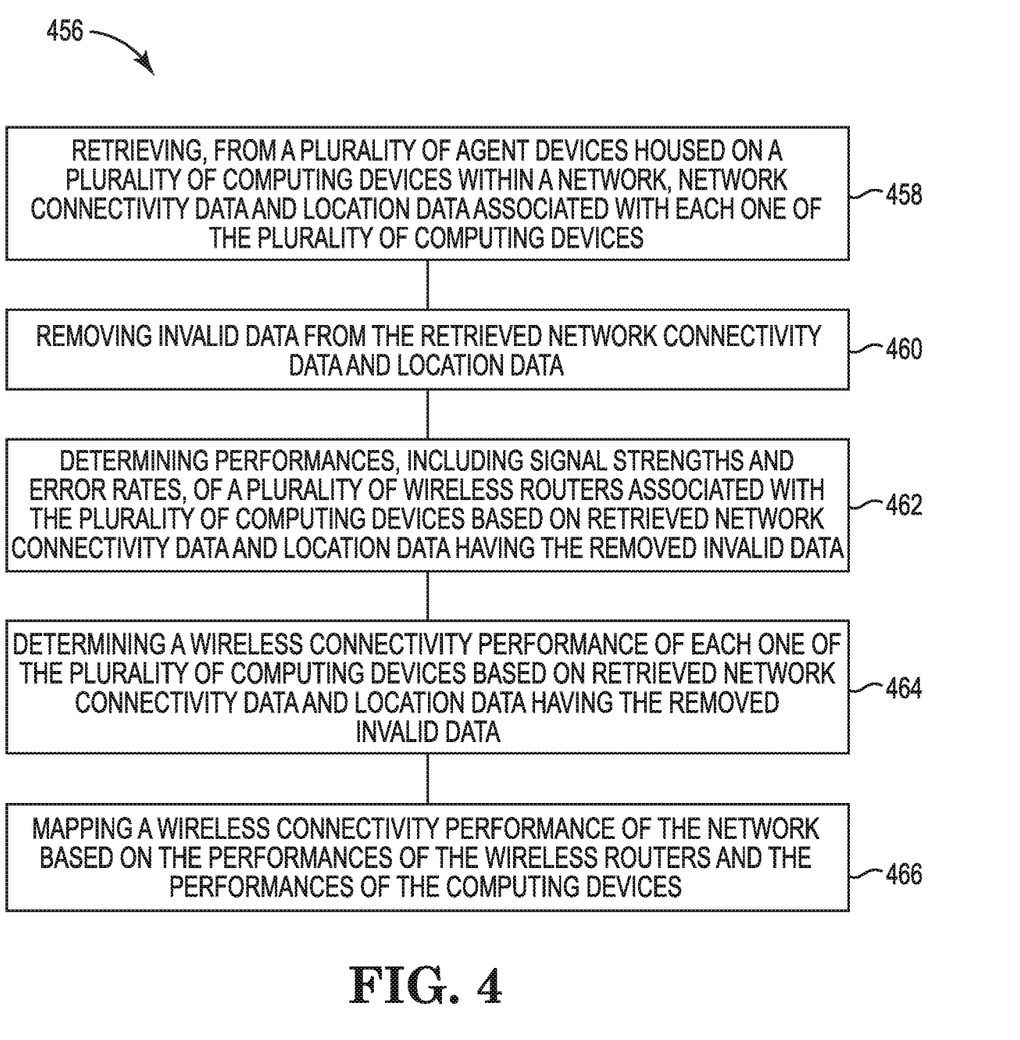
FIG. 4 illustrates another method for determining router and computing device performance according to an example.

FIG. 4 illustrates another method 456 for determining router and computing device performance according to an example. The method 456 may be performed by a system 212 and/or controller 102 as described with respect to FIGS. 1-2. At 458, the method 456 includes retrieving, from a plurality of agent devices housed on a plurality of computing devices within a network, network connectivity data and location data associated with each one of the plurality of computing devices, Example data collected can include, but is not limited to statistical and non-statistical networking data including application class versions, current data and time data, interface network data including interface types, network adapter data, system object detection data, operation states of network connections, bytes sent/received data, router data, security data, signal strength data, transmission and receipt rates, and WiFi data, among others. Data can also be retrieved, for instance, general computing device information, networking data transfer error data, and additional computing device location data.

At 460, the method 456 includes removing invalid data from the retrieved network connectivity data and location data. For instance, inaccurate, repetitive, redundant, irrelevant or other invalid data may be removed. In some examples, out-of-network wireless data can be removed from the retrieved network connectivity data and location data and/or non-wireless data (e.g., ethernet data) is removed from the retrieved network connectivity data and location data. Filtering the out-of-network data can include, for instance, comparing an in-network (e.g., office) location to the computing device's location and correlating the timing of the connectivity of a computing device to an in-network wireless router. Any data collected that does not overlap this correlation can be excluded. Filtering the non-wireless data can include excluding data not associated with the wireless routers and/or data collected via a SIM card, for example.

At 462, the method 456 includes determining performances, including signal strengths and error rates, of a plurality of wireless routers associated with the plurality of computing devices based on retrieved network connectivity data and location data having the removed invalid data. At 464, a wireless connectivity performance of each one of the plurality of computing devices based on retrieved network connectivity data and location data having the removed invalid data can be determined. For instance, average signal strength and error rate of network wireless routers can be compiled to determine performances and patterns for wireless routers, while connectivity issues (e.g., irrespective of an associated wireless router) of computing devices can be compiled to determine performances and patterns for computing devices.

At 466, the method 456 includes mapping a wireless connectivity performance of the network based on the performances of the wireless routers and the performances of the computing devices. Or instance, the mapping can include mapping wireless router quality and coverage and mapping computing device network card degradation, mapping quality of a particular computing device compared to other computing devices within the network, and/or mapping quality of a particular wireless router compared to other wireless routers within the network. The mapping, in some examples, can be presented as a router quality report, computing device network quality report, or both. The mapping, for instance, may be presented via a GUI in chart or graph format, among others.

The method 456 can provide a data-drive approach to determining user network experience including determining poor-performing computing devices (e.g., having bad WiFi network cards, ports, etc.), overburdened wireless routers (e.g., based on their poor performance), and/or missing or low-coverage WiFi areas around particular wireless routers. The method 456 can also provide for visualizations (e.g., mappings) regarding wireless router quality and coverage, as well as computing device WiFi network card degradation and quality. The method 456 can further provide for analysis over longer periods of time, as well as periodic and/or continuous monitoring of network connectivity.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein may be added, exchanged, and/or eliminated so as to provide a number of additional examples of the present disclosure. In addition, the proportion and the relative scale of the elements provided in the figures are intended to illustrate the examples of the present disclosure and should not be taken in a limiting sense. Further, as used herein, "a number of" an element and/or feature may refer to one or more of such elements and/or features.

What is claimed is:

1. A non-transitory machine-readable medium storing instructions executable by a processing resource to cause a computing system to:
   capture, from an agent device on a computing device of a network, computing device data that describes the computing device and network connectivity data that describes the computing device connectivity with a wireless router of the network;
   filter data associated with connectivity to non-WiFi networks from the computing device data and the network connectivity data such that the data associated with connectivity to non-WiFi networks is removed from the computing device data and the network connectivity data;
   filter out-of-network data from the computing device data and the network connectivity data such that the out-of-network data is removed from the computing device data and the network connectivity data;
   correlate the filtered data with performance data of the wireless router; and
   based on the correlation, determine router and computing device performances.

2. The medium of claim 1, further comprising the instructions executable to capture, from the agent device, computing device location data, network error data, and network transmission data.

3. The medium of claim 2, further comprising the instructions executable to capture the network connectivity data at a time of connection to a WiFi router and at a time of disconnection from the WiFi router.

4. The medium of claim 1, further comprising mapping the router and computing device performances.

5. The medium of claim 1, further comprising the instructions executable to:
   capture the computing device data and the network connectivity data as raw data;
   filter invalid data from the raw data; and
   store the filtered raw data to a cloud.

6. The medium of claim 1, further comprising the instructions executable to determine, based on the router and computing device performances, a recommendation to improve network connectivity for the network.

7. The medium of claim 1, wherein the out-of-network data includes data collected by the agent device while the computing device was communicatively coupled to a second network different from the network.

8. The medium of claim 1, wherein the computing device data includes at least one of processor data, type of computing device data, memory data, or network card data.

9. The medium of claim 1, wherein the computing device data identifies a component of the computing device, and wherein the router and computing device performances includes a performance of the component of the computing device, wherein the component of the computing device includes at least one of a network card or a port.

10. The medium of claim 1, further comprising the instructions executable to capture the network connectivity data during a reboot of the computing device.

11. A system comprising:
    a controller communicatively coupled to an agent device on a computing device of a network, the controller to:
       capture, from the agent device, computing device data that describes the computing device and network connectivity data that describes the computing device connectivity with a wireless router of the network;
       filter data associated with connectivity to non-WiFi networks from the computing device data and the network connectivity data such that the data associated with connectivity to non-WiFi networks is removed from the computing device data and the network connectivity data;
       filter out-of-network data from the computing device data and the network connectivity data such that the out-of-network data is removed from the computing device data and the network connectivity data;
       correlate the filtered data with performance data of the wireless router; and
       based on the correlation, determine router and computing device performances.

12. The system of claim 11, wherein the controller is further to: capture, from the agent device, computing device location data, network error data, and network transmission data.

13. The system of claim 12, wherein the controller is further to capture the network connectivity data during a connection to a WiFi router and during a disconnection from the WiFi router.

14. The system of claim 11, wherein the controller is further to map the router and computing device performances.

15. The system of claim 11, wherein the controller is further to:
- capture the computing device data and the network connectivity data as raw data;
- filter invalid data from the raw data; and
- store the filtered raw data to a cloud.

16. A method, comprising:
- capturing, from an agent device on a computing device of a network, computing device data that describes the computing device and network connectivity data that describes the computing device connectivity with a wireless router of the network;
- filtering data associated with connectivity to non-WiFi networks from the computing device data and the network connectivity data such that the data associated with connectivity to non-WiFi networks is removed from the computing device data and the network connectivity data;
- filtering out-of-network data from the computing device data and the network connectivity data such that the out-of-network data is removed from the computing device data and the network connectivity data;
- correlating the filtered data with performance data of the wireless router; and
- based on the correlation, determining router and computing device performances.

17. The method of claim 16, further comprising:
capturing, from the agent device, computing device location data, network error data, and network transmission data.

18. The method of claim 17, further comprising:
capturing the network connectivity data during a connection to a WiFi router and during a disconnection from the WiFi router.

19. The method of claim 16, further comprising:
mapping the router and computing device performances.

20. The method of claim 16, further comprising:
- capturing the computing device data and the network connectivity data as raw data;
- filtering invalid data from the raw data; and
- storing the filtered raw data to a cloud.

* * * * *